(12) United States Patent
Lovell, Jr. et al.

(10) Patent No.: US 7,460,873 B2
(45) Date of Patent: *Dec. 2, 2008

(54) UNIVERSAL SHORT CODE ADMINISTRATION FACILITY

(75) Inventors: Robert C. Lovell, Jr., Leesburg, VA (US); Christian Zimmern, Fairfax, VA (US)

(73) Assignee: Sybase 365, Inc., Reston, VA (US)

( * ) Notice: Subject to any disclaimer, the term of this patent is extended or adjusted under 35 U.S.C. 154(b) by 508 days.

This patent is subject to a terminal disclaimer.

(21) Appl. No.: 10/889,024

(22) Filed: Jul. 13, 2004

(65) Prior Publication Data

US 2004/0260838 A1 Dec. 23, 2004

Related U.S. Application Data

(63) Continuation-in-part of application No. 10/742,764, filed on Dec. 23, 2003.

(60) Provisional application No. 60/445,453, filed on Feb. 7, 2003.

(51) Int. Cl.
*H04Q 7/20* (2006.01)
(52) U.S. Cl. .................. 455/466; 455/406; 455/414.1
(58) Field of Classification Search ............. 455/466, 455/406, 412.1, 414.1
See application file for complete search history.

(56) References Cited

U.S. PATENT DOCUMENTS

| | | |
|---|---|---|
| 5,351,235 A | 9/1994 | Lahtinen |
| 5,621,727 A | 4/1997 | Vaudreuil |
| 5,768,509 A | 6/1998 | Gunluk |
| 5,887,249 A | 3/1999 | Schmid |
| 5,894,478 A | 4/1999 | Barzegar et al. |
| 6,208,870 B1 | 3/2001 | Lorello et al. |
| 6,230,009 B1 | 5/2001 | Holmes et al. |

(Continued)

FOREIGN PATENT DOCUMENTS

EP     0 777 394 A1     12/1995

(Continued)

OTHER PUBLICATIONS

Zachary Rodgers, "SMS Short Codes Come Alive on TV", Mar. 19, 2003, http://www.instantmessagingplanet.com/wireless/article.php/2118811.*

(Continued)

*Primary Examiner*—Erika A Gary
(74) *Attorney, Agent, or Firm*—Edell, Shapiro & Finnan, LLC

(57) ABSTRACT

Systems and methods for assigning short codes to provide uniformity among wireless carriers. In the systems and methods, a Universal Short Code (USC) Administrator maintains a list of short codes and their lease status so that SMS messages sent to a particular short code may be routed to the proper holder of the short code. A network facilitator is in communication with both the USC Administrator and at least one wireless carrier to route the SMS message to the proper holder of the short code. The short code may be leased for a specified period of time so that the short code can be reassigned after expiration of the lease. The systems and methods also support inquiries concerning particular short codes, leases, lessees, and usage prices.

27 Claims, 5 Drawing Sheets

U.S. PATENT DOCUMENTS

| | | | |
|---|---|---|---|
| 6,292,669 B1 * | 9/2001 | Meuronen et al. | 455/466 |
| 6,366,663 B1 | 4/2002 | Bauer et al. | |
| 6,421,437 B1 | 7/2002 | Slutsman | |
| 6,535,746 B1 | 3/2003 | Yu et al. | |
| 6,560,226 B1 | 5/2003 | Torrey et al. | |
| 6,658,260 B2 | 12/2003 | Knotts | |
| 6,920,487 B2 * | 7/2005 | Sofer et al. | 709/218 |
| 2002/0029189 A1 | 3/2002 | Titus et al. | |
| 2002/0112014 A1 | 8/2002 | Bennett et al. | |
| 2003/0083078 A1 | 5/2003 | Allison et al. | |
| 2003/0134614 A1 * | 7/2003 | Dye | 455/406 |
| 2004/0165569 A1 * | 8/2004 | Sweatman et al. | 370/349 |
| 2006/0167699 A1 * | 7/2006 | Rontynen et al. | 705/1 |
| 2007/0066328 A1 * | 3/2007 | Sweatman et al. | 455/466 |

FOREIGN PATENT DOCUMENTS

| | | |
|---|---|---|
| EP | 0 959 600 A1 | 4/1999 |
| WO | WO 97/36434 | 3/1996 |
| WO | WO 97/20442 | 11/1996 |
| WO | WO 99/11078 | 8/1998 |
| WO | WO 99/33226 | 12/1998 |
| WO | WO 00/41533 | 1/2000 |
| WO | WO 02/25875 A1 | 9/2001 |
| WO | WO 2004/105405 A2 | 12/2004 |

OTHER PUBLICATIONS

Zachary Rodgers, "CTIA Debuts Universal SMS Short Codes", Oct. 22, 2003, http://www.clickz.com/news/print.php/3097161.*

Zachary Rodgers, "U.S. Wireless Carriers Debut Universal Short Codes", Oct. 23, 2003, http://www.instantmessagingplanet.com/wireless/print.php/3098231.*

Bob Woods, "SMS to Help Foster mCommerce", Apr. 18, 2002, http://www.instantmessagingplanet.com/wireless/article.php/1011831.*

* cited by examiner

UNIVERSAL SHORT CODE ADMINISTRATION FACILITY

This application is a continuation-in-part of U.S. application Ser. No. 10/742,764, filed Dec. 23, 2003, which claims the benefit of U.S. Provisional Application No. 60/445,453 filed Feb. 7, 2003, both of which are herein incorporated by reference in their entirety.

BACKGROUND

1. Field of the Invention

The present invention is related to improvements in mobile telephone networks' Short Message Service (SMS). More particularly, the present invention is related to systems and methods for administering, monitoring and controlling short codes such that the short codes can be employed consistently across different networks.

2. Background

Short Message Service (SMS) is a convenient and easy to use messaging application available to mobile telephone users. SMS offers a new way to communicate by sending text or data messages between mobile phones or between a mobile phone and information devices, such as a personal computer (PC), a PDA (personal digital assistant), or a handheld email/calendar organizer (e.g., a wireless email device). Messages are composed of words, up to 160 characters in length for Latin alphabets (about 30 to 40 words) and 70 characters for non-Latin alphabets like Arabic and Chinese. To send, text messages are keyed into a mobile phone keypad or other information device. Received text messages are presented on the mobile telephone's screen.

Usually, messages are delivered almost immediately, even when the mobile phone is in use. However, if the phone is turned off, for example, or if the user is in an area without cellular coverage, messages are stored in the network and delivered as soon as the phone is switched back on or the phone enters an area that has coverage.

Introduced in Europe and the United Kingdom (U.K.) during the mid-1990s and in Asia soon thereafter, SMS encountered great enthusiasm, especially among teenagers and young adults. And although SMS had originally been conceived as a paging system, users quickly adapted text messaging for their own objectives. By the late 1990s, GSM carriers in both Europe and the U.K. had connected their networks, allowing their subscribers to exchange text messages across other GSM carriers. In 2001, 700 million mobile phone users worldwide sent 20 billion messages every month, making SMS the fastest growing service in the wireless industry.

Typically, messages are addressed to another telephone via the telephone number belonging to the recipient's mobile telephone. On the other hand, a portion of messages that are sent via SMS are not sent to another telephone or PDA as in a Person-to-Person communication, but are instead directed to a central location. While the central location could have a regular 10-digit telephone number as does a typical mobile telephone, SMS messages directed to a central location are often so-directed using a short code address. A short code address is a convenient short number that identifies a central location to which an SMS message can be sent. A typical application of short code use is Tele-voting in which, for example, a television program flashes on the screen instructions to "Send an SMS message to 8012 to vote yes." In the United States, exclusive ranges of available short codes have been assigned to each of the several mobile telephone service providers to be used at their discretion. Consequently, the market penetration for, for example, a Tele-voting application, is limited because the designated short code will operate on (or only have meaning to) a particular mobile telephone service provider.

In other words, if the television program flashes a single SMS short code on the screen, only the votes of users who happen to be customers of the service provider that "owns" that short code will be received. Thus, any resulting vote will necessarily be skewed, since only a segment of the viewing population will have the opportunity to vote.

The foregoing use and associated problems with this type of short code use is meant to be exemplary only. Those skilled in the art will appreciate that there are myriad other uses for short codes, but all such uses would still have the deficiency of having short codes restricted to a particular service provider.

BRIEF SUMMARY OF THE INVENTION

In a preferred embodiment of the present invention, a single centralized SMS Universal Short Code (USC) Administrator (UA) maintains a database containing all of the available short codes and whether they are currently in use. The available short codes may include all four digit, five digit, six digit, or other short code number combinations.

When an Application Provider (AP) needs a short code, either a particular short code or any randomly available short code, it submits a request for a short code to the UA. The AP may want to use a particular code for any number of purposes, such as, for example, promotional activities, tele-voting, and advertising campaigns. The UA reviews the request and, upon approval, "leases" the short code to the AP. In this context, the term "lease" means that the UA assigns the short code to the AP for a specific period of time. Once the AP has leased the short code, it informs the public of the existence of the short code and encourages the public to perform some task using the short code, such as "Send a SMS to 8012 to enter the contest."

When a mobile subscriber (MS) sends an SMS message using the short code, the message is transmitted to the subscriber's wireless carrier (WC). The WC, in turn, passes the SMS message to a Network Facilitator (NF). In a preferred implementation, the NF is an SMS message routing intermediary, which is capable of receiving SMS messages and routing them to the specified destination, even between different wireless carriers.

Upon receipt of the message, the NF issues a routing request to the UA to resolve the short code. The UA then returns a routing response to the NF indicating the AP that is associated with the short code at that particular point in time so that the NF can deliver the SMS message to the proper AP.

Thus, as can be readily appreciated, it is possible to temporarily assign a short code to one AP for a lease period and, thereafter, assign the same short code to another AP. By temporarily assigning short codes, it is possible to ensure that a sufficient number of short codes are available. In addition, it is possible for APs to provide services to a greater number of MSs across different WCs without concern about each WC using its own short codes.

The foregoing and other features and attendant advantages of the present invention will be more fully appreciated upon a reading of the following detailed description in conjunction with the associated drawings.

DETAILED DESCRIPTION OF THE INVENTION

Figure 1:
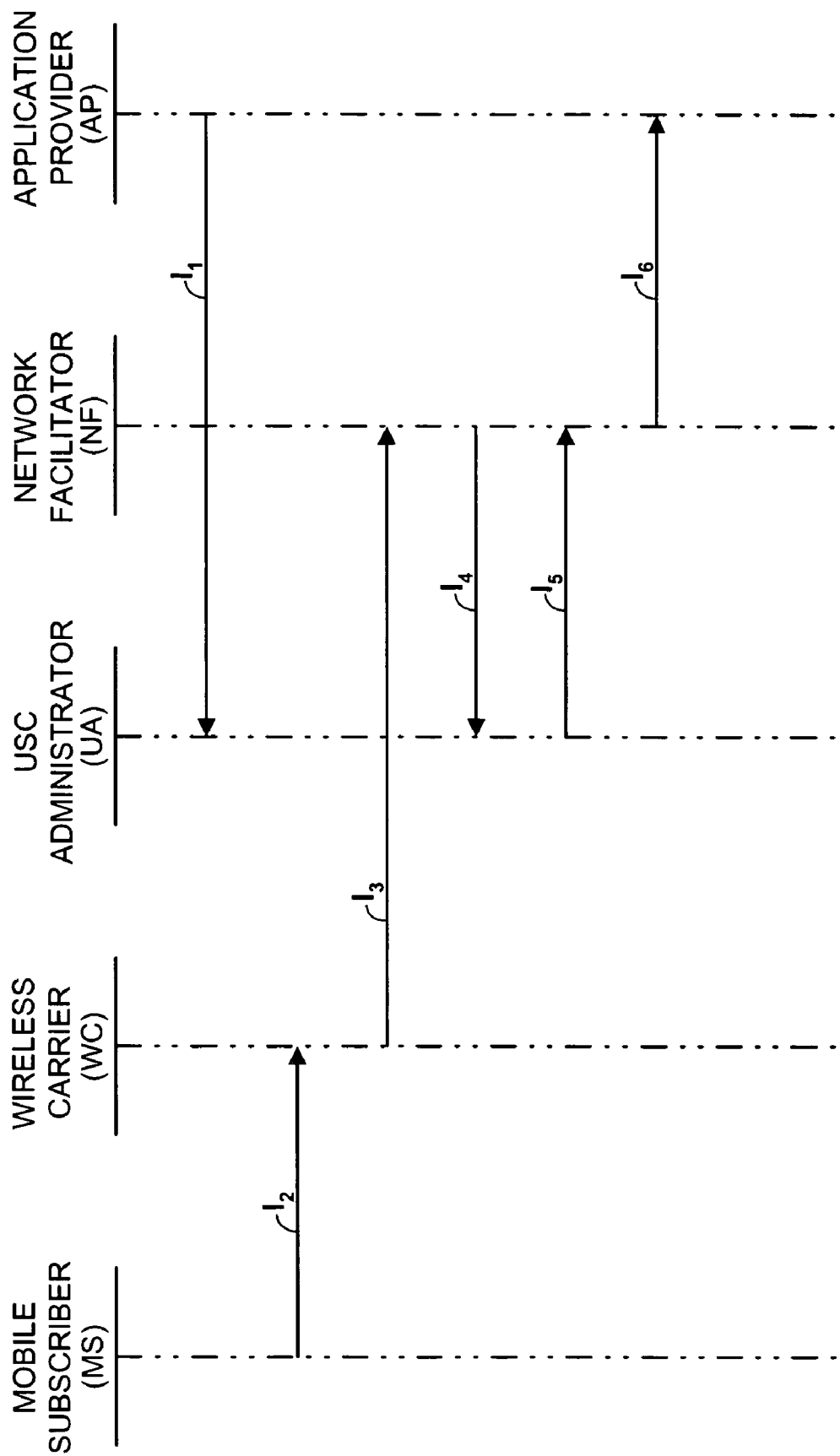
FIG. 1 is a diagram representing an exemplary implementation of an embodiment of the present invention.

The present invention addresses the short code deficiency described above with respect to the prior art by implementing a universal short code regime that is administered by, for example, a third party, and that enables the use of the same short codes across different service providers.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 provides a general overview of the present invention. In this exemplary embodiment, a single centralized SMS Universal Short Code (USC) Administrator (UA) maintains a database containing all of the available short codes and whether they are currently in use. The available short codes may include all four digit, five digit, six digit, or other short code number combinations.

When an Application Provider (AP) needs a short code, either a particular short code or any randomly available short code, it submits a request for a short code to the UA at $I_1$. The AP may want to use a particular code for any number of purposes, such as, for example, promotional activities, televoting, and advertising campaigns. The UA reviews the request and, upon approval, "leases" the short code to the AP. In this context, the term "lease" means that the UA assigns the short code to the AP for a specific period of time. Once the AP has leased the short code, it informs the public of the existence of the short code and encourages the public to perform some task using the short code, such as "Send a SMS to 8012 to enter the contest."

When a mobile subscriber (MS) sends an SMS message using the short code, it is transmitted to a wireless carrier (WC) at $I_2$. The WC, in turn, passes the SMS message to a Network Facilitator (NF) at $I_3$. The NF is preferably an SMS message routing intermediary, which is capable of receiving SMS messages and routing them to the specified destination. Such an intermediary is described in U.S. application Ser. No. 10/426,662, filed May 1, 2003, and its continuation-in-part application, U.S. application Ser. No. 10/831,329, filed Apr. 26, 2004, both of which are incorporated herein by reference in their entirety.

The NF issues a routing request to the UA to resolve the short code at $I_4$. The UA then returns a routing response to the NF indicating the AP that is associated with the short code at that particular point in time at $I_5$ so that the NF can deliver the SMS message to the proper AP at $I_6$.

In this exemplary embodiment, it is possible to temporarily assign a short code to one AP for a lease period and, thereafter, assign the short code to another AP. By temporarily assigning short codes it is possible to ensure that a sufficient number of short codes are available. In addition, it is possible for APs to provide services to a greater number of MSs across different WCs without concern about each WC using its own short codes.

Figure 2:
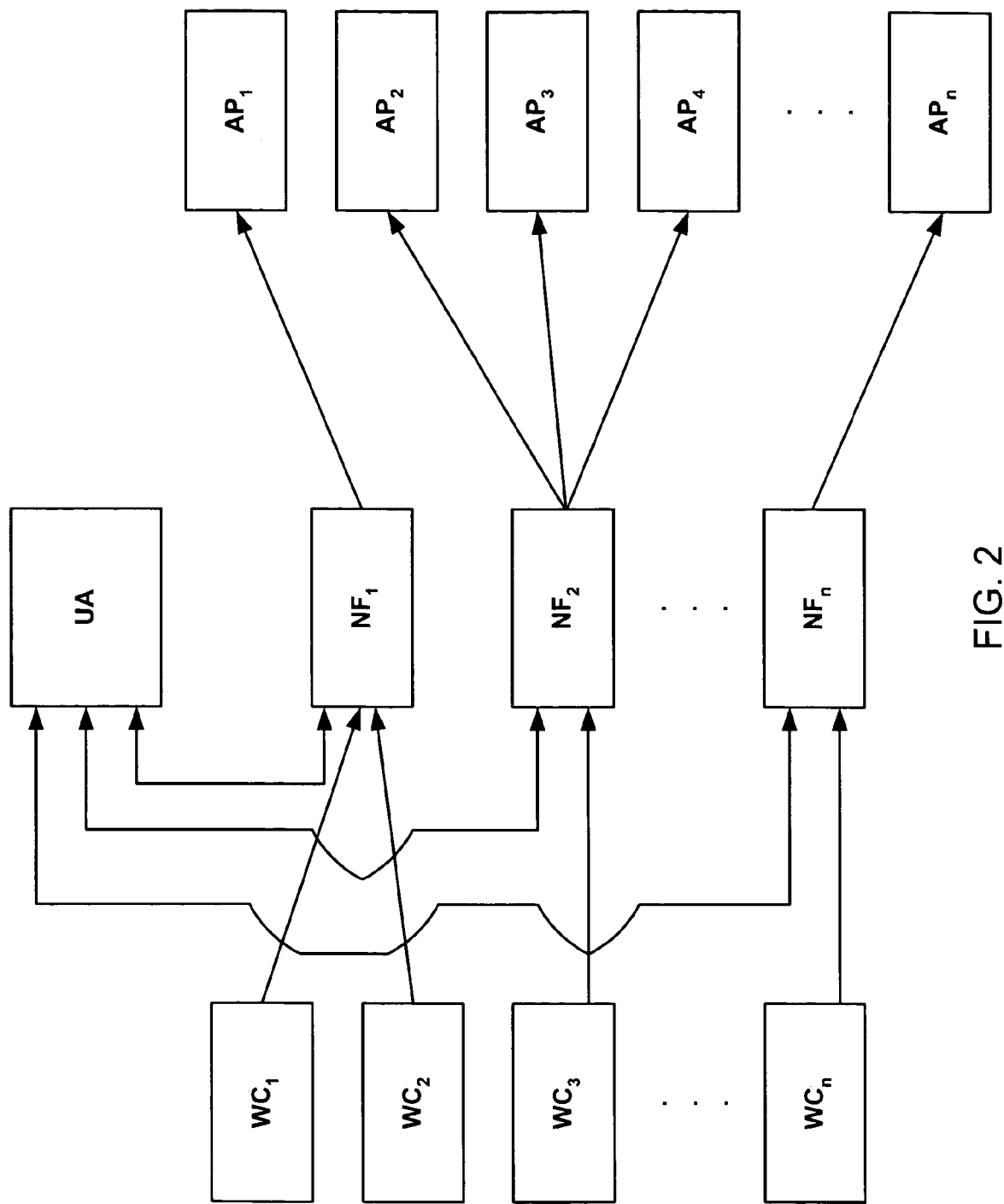
FIG. 2 shows a schematic diagram representing a physical implementation of a portion of the present invention shown in FIG. 1.
Figure 3:
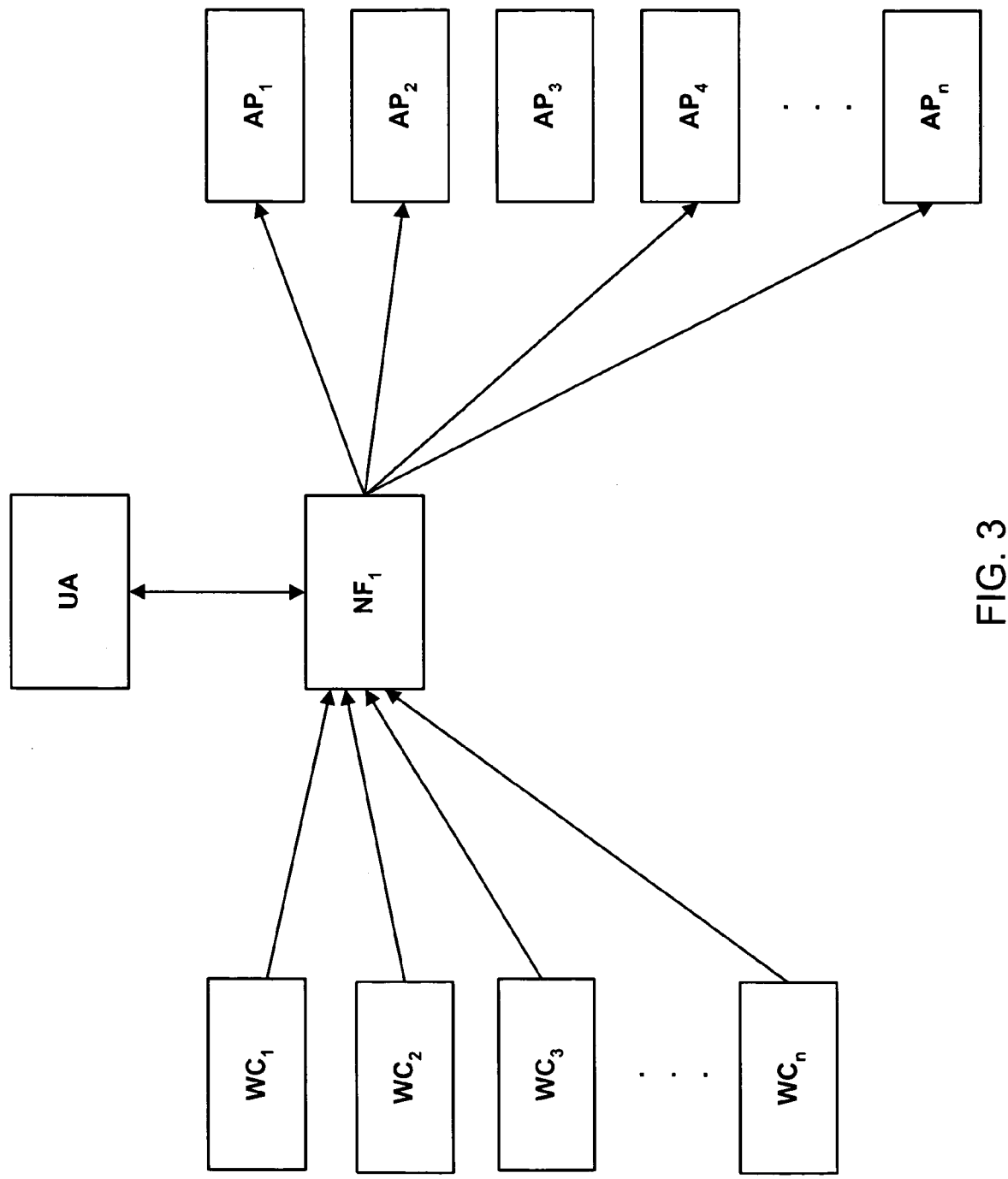
FIG. 3 shows a schematic diagram representing an alternative physical implementation of a portion of the present invention shown in FIG. 1.

FIGS. 2 and 3 show various exemplary embodiments of physically implementing such a system between one or more WCs and one or more APs. More specifically, FIG. 2 shows an exemplary embodiment where multiple wireless carriers $WC_1$, $WC_2$, $WC_3$, ... $WC_n$ interact with multiple Network Facilitators $NF_1$, $NF_2$, $NF_3$, ... $NF_n$. The Network Facilitators, in turn, are in communication with a USC Administrator (UA) as well as multiple Application Providers $AP_1$, $AP_2$, $AP_3$, ... $AP_n$.

As shown in FIG. 2, any NF can be in communication with one or more WCs. The NFs can also communicate amongst themselves using known "peering" arrangements. By providing multiple NFs, it may be possible to more efficiently process SMS messages sent using short codes because each NF will have more resources available. Moreover, it may be possible to set up the system so that each NF is optimized dependent on the type of messaging protocol, such as, for example, Short Message Peer-to-Peer (SMPP), Simple Mail Transfer Protocol (SMTP), Hyper Text Transfer Protocol (HTTP), between the WCs, the NFs, and the APs. Furthermore, each NF may be geographically dispersed so that message routing by the WCs may be streamlined.

FIG. 3 shows another exemplary embodiment where multiple wireless carriers $WC_1$, $WC_2$, $WC_3$, ... $WC_n$ interact with a single Network Facilitator $NF_1$. The Network Facilitator, in turn, is in communication with a USC Administrator (UA) as well as multiple Application Providers $AP_1$, $AP_2$, $AP_3$, ... $AP_n$. By providing a single NF, it may be possible for a single entity to control and maintain both the UA and the NF functionality. It is also understood that each of the entities described above (i.e., WCs, NFs, UA, APs) may be realized as a single entity or as a logical collection of entities.

Figure 4:
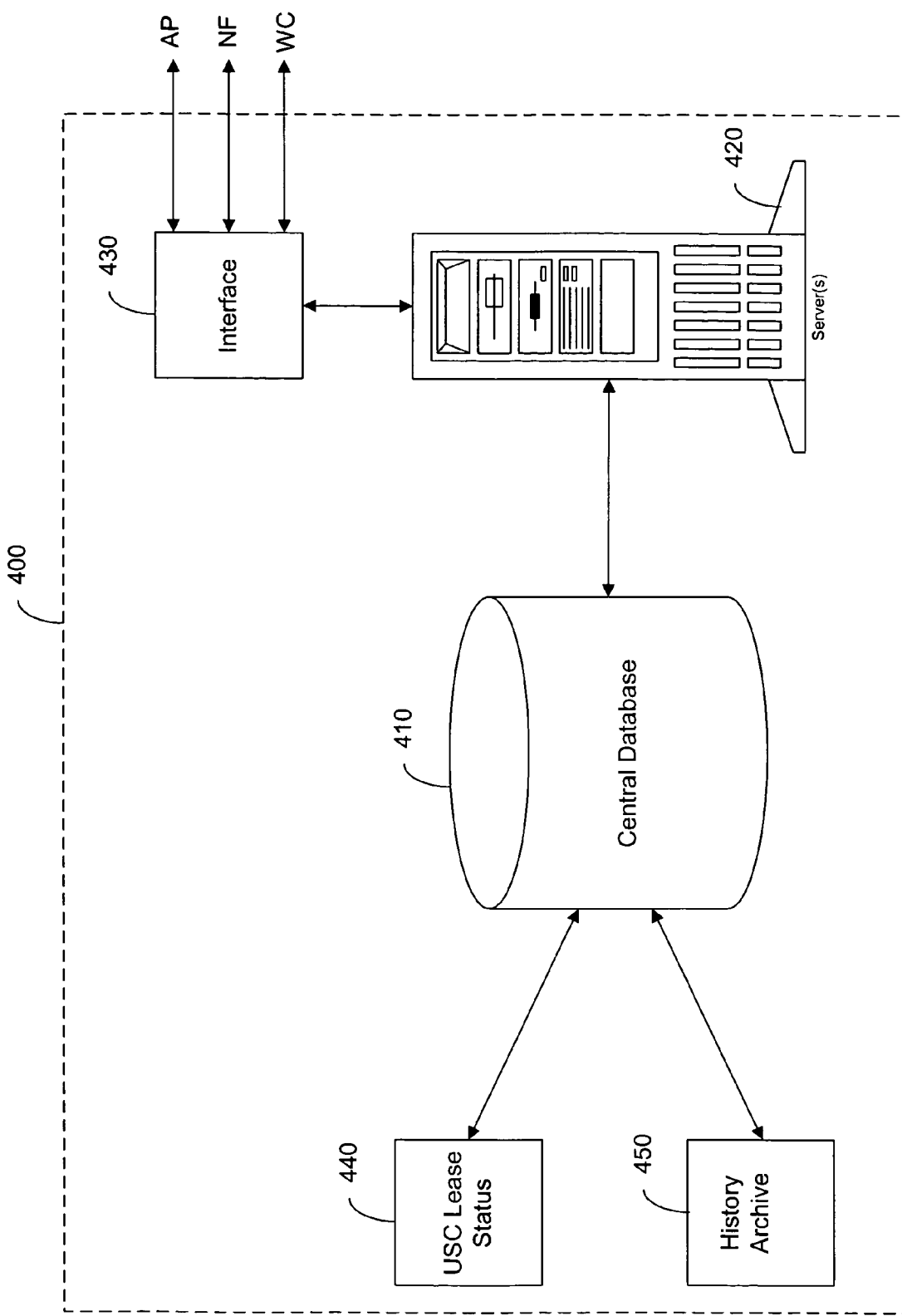
FIG. 4 shows a schematic diagram of an exemplary embodiment of a Universal Short Code Administrator shown in FIG. 1.

An exemplary embodiment of a UA 400 is shown in FIG. 4. In this embodiment, the UA includes a centralized database 410, one or more servers 420, and an interface 430 for monitoring the server 420. The interface is preferably configured to send and receive commands/requests to and from one or more APs, WCs, and NFs. These commands/requests may be in the form of XML commands or any other suitable forms. In addition, the interface 430 may include a graphical user interface to assist in the monitoring and controlling of the UA 400.

The centralized database 410 preferably includes at least two files that maintain the status of the short codes. A lease status file 440 contains a list of all short codes that have been leased and the status of the lease (e.g., leased, available for lease, or out of range of possible short codes). The status of the lease may include the holder of the lease (the AP), the term of the lease, the time remaining on the lease, and any other relevant information. This information is useful in responding to inquiries asking about the status of a lease for a particular short code.

A history archive file 450 is provided for auditing purposes. This file may contain information about all APs that have been assigned to a particular short code, the duration that the short code was leased by each AP, the number of times the short code was accessed during each lease, or any other information that would be tracked for auditing purposes.

In addition, the centralized database 410 may include files that store profiles for all external entities—APs, WCs, and NFs—that communicate with the UA 400. These profiles may contain information identifying the particulars of, and the options for, each of the external entities. Such particulars could include, for example, an entity's name, mailing address, telephone number, point of contact, email address, login identification (ID) and password, and Web site URL (Uniform Resource Locator). This information is useful in responding to inquiries asking who has leased a particular short code.

In a further embodiment, the centralized database 410 also includes usage price information for short codes. Such information would be useful in a premium content/billing environment. For example, if particular short codes are easier to remember (e.g., "7777") and thus more desirable, higher usage prices could be charged for those particular short codes. As another example, usage prices could vary depending on the duration and particular time of the lease. A longer duration could be discounted, akin to a "volume discount." The particular time of the lease could also affect price. For example, a higher usage price could be charged for short codes leased during times corresponding to prime time on television. This usage price information would therefore be useful in responding to inquiries asking for cost estimates for short code leases.

The centralized database 410 may also include configuration files that specify the acknowledgement model used by the UA. The acknowledgement models will be described below in relation to FIG. 5.

Figure 5:
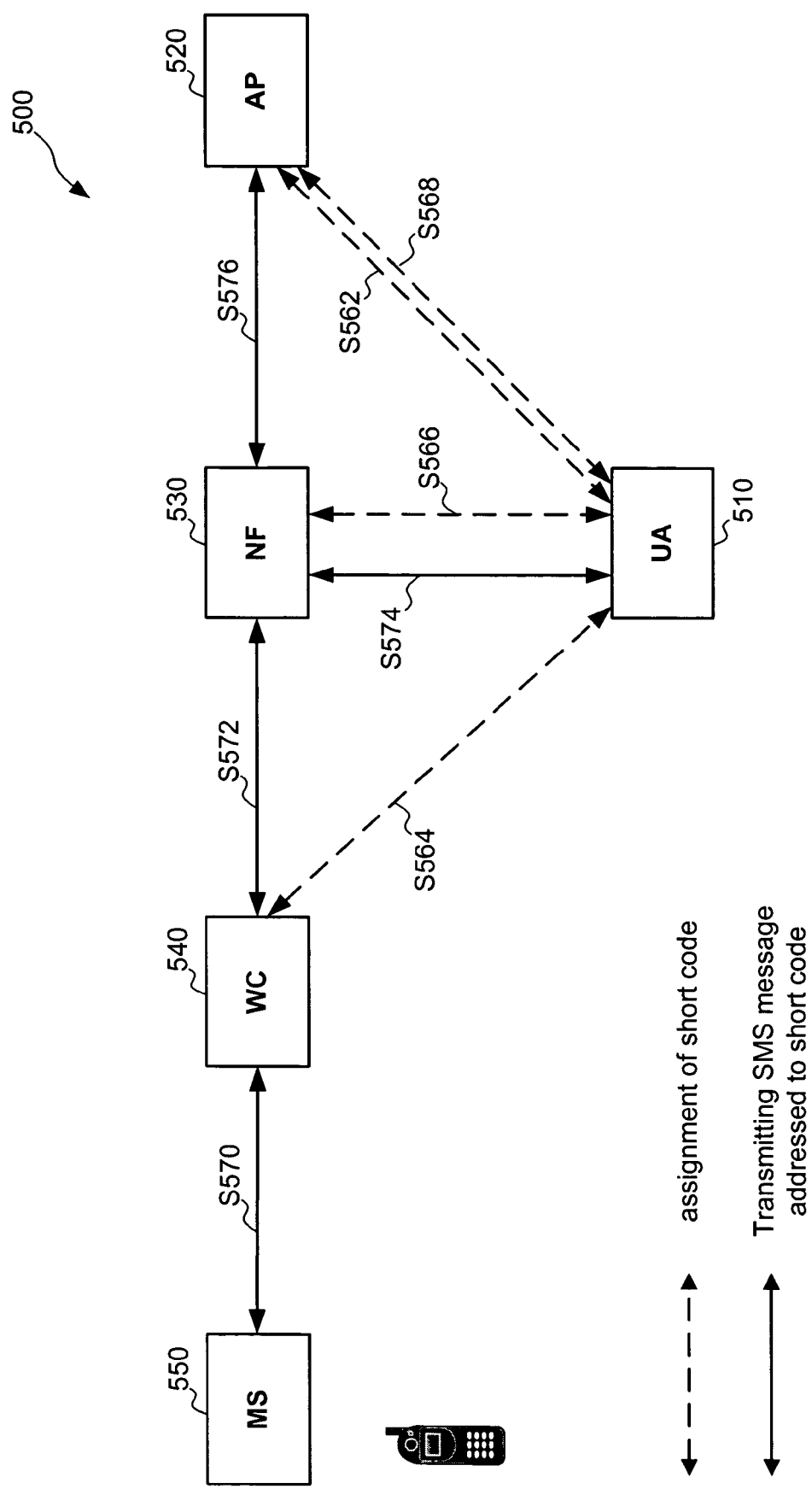
FIG. 5 shows schematically the interaction of components shown in FIG. 1.

FIG. 5 shows the interaction of an exemplary system 500 including a MS 550, WC 540, NF 530, AP 520, and UA 510 of the exemplary embodiment shown in FIG. 1. For sake of simplicity, FIG. 5 shows only one of each component, but it is understood that there may be one or more MSs, one or more WCs, one or more NFs, one or more APs, and a single UA. Although multiple UAs are possible, there is preferably, from a logical point of view, only a single UA. In FIG. 5, the WC 540, NF 530, and AP 520 are all assumed to have successfully completed a qualification and approval process with the UA 510 and are recognized by the UA 510. This process may be any known process that satisfies the UA's requirements for authentication. Each entity may be assigned a permanent identification value that is used when interacting with the UA 510. The identification value may be used for authentication, tracking, or other reporting functions by the UA 510. As stated above, there may be any number of WCs, NFs, and APs that are recognized by the UA.

Once AP 520 determines that it will need a short code for an upcoming event, such as, for example, a promotional campaign or tele-voting, AP 520 establishes a secure TCP/IP connection with a server of UA 510 and requests a logical session be established between AP 520 and UA 510. For example, AP 520 may send a session request that includes AP 520's identification value and password, if required. UA 510 receives the session request from AP 520, logs the request, performs a validation and authentication operation, and returns a positive acknowledgement to AP 520.

Once the session request is acknowledged, AP 520 submits a lease request for a particular (or randomly available) short code for a specified period of time. For example, when a particular short code is requested, the AP 520 may send a lease request for short code "8012" with a start date of Dec. 9, 2002 and an end date of Dec. 13, 2002. UA 510 receives the lease request from AP 520 and logs the request. UA 510 then performs a series of validation and authentication operations to determine that the short code is available for lease during the requested time period. For example, UA 510 may read the lease status file stored on the centralized database to determine whether the short code is available. If the short code is available, UA 510 updates the centralized database to reflect that short code 8102 has been requested by AP 520 for the time period of Dec. 9, 2003 through Dec. 13, 2003 and is pending approval. This information may be identified with a unique lease identification value.

Alternatively, when a random available short code is requested, the UA looks for the next available short code and updates the centralized database to reflect that the next available short code has been requested for a specified period of time and is pending approval.

Finally, the UA 510 may issue a response back to AP 520 including the lease identification value and the pending status. This entire session interaction for the particular (or randomly available) short code is shown at S562 in FIG. 5.

UA 510 may issue a short code lease review request to WC 540 at S564 and/or NF 530 at S566. The WC 540 and/or NF 530 review the short code lease request and, provided that everything is in order, in an exemplary embodiment issue a positive acknowledgement back to the UA 510. After receiving positive acknowledgement from the WC 540 and/or NF 530, the UA 510 logs the responses and performs a series of validation and authentication operations. UA 510 updates its centralized database to indicate that short code 8102 has been leased to AP 520 for the time period Dec. 9, 2003 through Dec. 13, 2003. UA 510 returns a positive acknowledgement that the lease is approved to AP 520 at S568.

There are alternative acknowledgement models that may be used in place of the positive acknowledgement model described above. For example, the UA 510 may set a threshold value, which may be less than the total number of WCs and NFs sent the short code lease review, for the number of positive acknowledgements necessary for lease approval. Alternatively, a negative acknowledgement model may be used. For this model, the UA 510 would set a threshold value for which the number of negative responses cannot exceed if the lease is to be approved. This may be set as low as one so that a single WC or NF can block the lease assignment. In this model, only those WCs and NFs that do not want the short code to be leased need respond.

A further modification to either the positive or negative acknowledgement model includes assigning a "weighting" value or factor to each responding WC or NF. At any point in time the resulting "weighted" lease response total equals:

$$\Sigma(\text{WeightingFactor}_i * \text{Entity}_i)$$

where WeightingFactor$_i$ is the weighting factor assigned to the entity (WC or NF) and Entity$_i$ is the response of the entity.

Each entity may have a different weighing value depending on the entities to which a UA wants to give special preference. For example, the UA may give greater preference to NFs, or a particular NF, over all other entities. Alternatively, the UA may give greater preference to one or more WCs if they are the predominate WCs in the area. These weighting values may be adjustable over time based on market factors, contracts, or any other changing conditions.

The UA may also want to specify a particular period for responding to the lease request, such as, for example, several hours, one or more calendar days, or an infinite number of days. This period for responding along with choosing a particular acknowledgement model provides great flexibility to the UA.

After the lease is approved to AP 520 at S568, MS 550 sees AP's promotional use of short code 8102 and sends an SMS message to short code 8102. This may be accomplished through a number of intermediary steps. For example, the SMS message is transmitted to WC 540 at S570. WC 540 determines that the SMS message is addressed to a particular short code and forwards the message to NF 530 associated with the WC 540 at S572.

NF 530 receives the SMS message and, at S574, issues a routing inquiry to the UA 510 to resolve the destination for short code 8102. In other words, to authoritatively determine which AP 520 the NF 530 should deliver the SMS message to, NF 530 establishes a secure TCP/IP connection with the UA 510 and establishes a logical session with the UA 510 and receives a session ID. After establishing the logical session, NF 530 sends a short code routing request for the particular short code. The UA 510 receives and logs the short code routing request and performs a series of validation and authentication operations. The UA 510 returns a routing response to NF 530 indicating which AP 520 is currently associated with the particular short code. In addition to the identity of AP 520, the routing response could also include additional information about AP 520 such as a point of contact, telephone number, mailing address, and email address.

At S576, NF 530 delivers the SMS message to AP 520 after receiving the routing response from UA 510. AP 520 processes the SMS message appropriately.

Any subsequent messaging traffic may follow a path similar to the path described above.

One advantage to the above system is that the AP leases the short code for a specific period of time, after which, the short code may be reassigned to another AP. Any subsequent SMS messages to the short code may indicate that it is unassigned or be transmitted to a different AP that is leasing the short code. Therefore, a finite number of short codes may be utilized to serve a much larger group of APs. Moreover, the UA may monitor the volume of SMS message traffic addressed to the short code, for example, by monitoring the number of incoming short code routing requests. Depending on circumstances, such as, for example, a low usage with a lengthy lease period or a low usage with a desirable short code, the UA may optionally rescind the short code lease.

In addition, a further modification to the leasing of short codes includes providing an automatic lease renewal for a number of time periods, where each time period is defined as a number of days. This would allow an AP to have extended use of an assigned short code without having to send repeated requests each time a short code lease is set to expire. The UA may maintain control by setting a limit as to the number of automatic lease renewals or by monitoring the use of the short code.

It should be understood that the physical implementation of the system may include any number of elements that increase performance, improve operational reliability, or improve operational efficiency. For example, a NF may cache or store locally some or all of the routing information returned from the UA for a particular short code. In such a scenario, the NF would be responsible for ensuring that the cache or locally stored information is synchronized with the UA's authoritative list.

The UA may also "broadcast" information to all interested parties at specified periods. For example, the broadcast may include information about which short codes' leases are to expire the following day and/or the short codes leased that day. The interested parties may include all NFs associated with the UA. This broadcast may be continuous or scheduled (e.g., hourly, daily, or weekly) to exchange or transfer information from the UA to the NF containing updates on short code lease assignments. The NFs may also broadcast information that is locally cached to the UA continuously or at scheduled times regarding short code usage to assist the UA in monitoring the short code usage and determining whether a short code lease should be terminated.

A further embodiment of the present invention supports reporting and other general status and inquiry capabilities. These capabilities are provided by additional classes of messages that are exposed by a Universal Short Code administrator, such as UA 510 shown in FIG. 5, to selected external entities. Thus, in addition to the session requests/responses, lease requests/responses, lease review requests/responses, and routing requests/responses described above, the present invention can support inquiries, for example, asking for the status of a particular short code, asking for information about the lessee of a particular short code, and asking for usage price information. The classes of messages for these additional inquiry capabilities would be supported by an appropriate set of extensions or enhancements to the various software processes described above.

Referring to FIG. 5, one exemplary inquiry enables an entity, such as AP 520, to query UA 510 for the status of a specific USC. (Optionally, the entity could be an NF or WC that, for example, works on behalf of an AP for a fee as part of an expanded service offering and thus submits inquiries for the AP.) The requesting AP 520 may be, for example, looking for an easily recognized and memorized short code (e.g., "1234") for an upcoming advertising effort. In this case, AP 520 would send a USC status request to UA 510, inquiring about the status of the "1234" short code. The following is an example of an XML message for this status inquiry:

```
<USCStatusRequest>
    <SessionID>
        34567
    </SessionID>
    <USC>
        1234
    </USC>
</USCStatusRequest>
```

The SessionID portion of this message identifies the logical session that has been previously established between AP 520 and UA 510. The USC portion of this message indicates the specific short code for which the status is being requested.

The response to the status inquiry message indicates the status of the particular short code, such as leased, available for lease, or out of range of possible short codes (an out of range short code could include, for example, a code beyond a defined range of acceptable short codes, such as 0000-9999, or a code within a defined range that one or more of the wireless carriers or network facilitators does not support). Another status value could be, for example, lease requested-awaiting approval. The following is an example of an XML message for this response:

```
<USCStatusResponse>
    <USC>
        1234
    </USC>
        <Status>
            Available
        </Status>
</USCStatusResponse>
```

The USC portion of this message indicates the particular short code for which the status is being reported. The Status portion indicates the status of the particular short code ("1234"), which in this example is available. Knowing that the short code is available, the requester, AP 520, could proceed with a lease request for the particular short code, as described in the embodiments above.

If the response to the status inquiry indicates, however, that the specified short code is leased, then a further embodiment of the present invention enables an inquiry as to who has leased the short code, including detailed information for that lessee. In this manner, for example, the requester can determine who is currently leasing the short code, and possibly contact the lessee to negotiate an earlier termination of the lease, if the requestor deems the particular short code important enough to obtain. The following is an example of an XML message asking about the lessee of a particular short code:

```
<USCLesseeRequest>
    <SessionID>
        34567
    </SessionID>
    <USC>
        1234
    </USC>
</USCLesseeRequest>
```

The SessionID portion of this message identifies the logical session that has been previously established between the requestor (e.g., AP 520) and UA 510. The USC portion of this message indicates the specific short code for which the lessee information is being requested.

A response to the lessee inquiry message could simply identify the name of the lessee. Preferably, however, the response also includes other data elements associated with the lessee, such as mailing address, telephone number, point of contact, expiration date of the lease, login ID and password, and Web site URL. The following is an example of an XML message responding to the lessee inquiry message:

```
<USCLesseeResponse>
    <USC>
        1234
    </USC>
    <Lessee>
        <Name>
            AbRsYz Incorporated
        </Name>
        <MailingAddress>
            123 Main St, Anytown, US
        </MailingAddress>
        <TelephoneNumber>
            1-703-555-1234
        </TelephoneNumber>
        <EmailAddress>
            administrator@abrsyz.com
        </EmailAddress>
        <PointofContact>
            Joe Contact
        </PointofContact>
        <LeaseExpirationDate>
            January 15, 2004
        </LeaseExpirationDate>
    </Lessee>
</USCLesseeResponse>
```

The USC portion of this message indicates the particular short code for which the lessee information is being reported, which in this case is "1234." The Lessee portion provides the data elements of the lessee of the particular short code. Knowing this information, the requestor is able to contact the lessee, if desired. In addition to the data elements shown in the example XML message above, one of ordinary skill in the art would appreciate that many other data elements could be included in the response message.

Further aspects of this embodiment of the present invention include other inquiry-like messages added to the messaging framework. For example, referring to FIG. 5, another exemplary inquiry enables an entity, such as AP 520, to query UA 510 for the usage price of a specific USC. Such inquiries would be useful in a premium content/billing environment. A price request message from AP 520 would specify, for example, the particular short code and lease term in which the requester is interested. A price response message from UA 510 would include the price of leasing the specified short code for the specified time. The prices could vary depending on the popularity of the short code and the lease time. With this pricing information, the requestor, AP 520, could then decide whether or not to request the lease.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for transmitting a message from a mobile subscriber to an application provider using a short code, the system comprising:

an administrator in communication with a database, wherein the database contains the short code and a status of the short code that indicates that the short code is leased;

a network facilitator selectably connectable to the administrator; and a plurality of wireless carriers selectably connectable to the network facilitator, wherein the mobile subscriber is associated with one of the plurality of wireless carriers, wherein the one of the plurality of wireless carriers connects to the network facilitator when receiving the message from the mobile subscriber addressed to the short code, wherein the network facilitator communicates with the administrator to obtain routing information indicating to which one of a plurality of application providers the short code is assigned, and based on the information thereafter delivers the message to the application provider, wherein the administrator, in response to a request asking whether the short code is available, provides the status of the short code, and wherein the administrator periodically broadcasts to the network facilitator information regarding (i) which short codes have recently been leased and (ii) which leases for short codes are soon to expire.

2. The system of claim 1, wherein the request is received from a second application provider and the status of the short code is provided to the second application provider.

3. The system of claim 1, wherein the database contains an identification of the application provider as the lessee of the short code, and wherein the administrator, in response to a request for the identification of the application provider, provides the identification of the application provider.

4. The system of claim 3, wherein the identification of the application provider includes at least two of a name of the application provider, a mailing address of the application provider, a telephone number of the application provider, an email address of the application provider, a point of contact for the application provider, a date on which the application provider's lease ends, a login ID and password of the application provider, and a Web site URL of the application provider.

5. The system of claim 1, wherein the database contains a price for leasing the short code, and wherein the administrator, in response to a request for the price for leasing the short code, provides the price for leasing the short code.

6. The system of claim 5, wherein the price for leasing the short code varies depending on at least one of when the short code is leased, how long the short code is leased, and how popular the short code is.

7. The system of claim 1, wherein the database contains a second short code and a status of the second short code, and wherein the administrator, in response to a request asking whether the second short code is available, provides the status of the second short code.

8. The system of claim 7, wherein the status of the second short code is one of leased, available for lease, out of range of possible short codes, and lease requested-awaiting approval.

9. The system of claim 1, wherein the request is received from an entity acting on behalf of a second application provider.

10. The system of claim 9, wherein the entity comprises one of a network facilitator and a wireless carrier.

11. The system of claim 1, wherein the administrator is configured to rescind a leased short code as a result of low usage.

12. A method for assigning a specific short code that is employed to route a non-voice message, the method comprising:

receiving from a first application provider a request to lease the specific short code that is to be employed to route a non-voice message from a mobile subscriber to an application provider;

verifying the availability of the specific short code via at least a database lookup;

temporarily assigning the specific short code to the first application provider;

notifying the first application provider of the assignment of the specific short code;

receiving from a second application provider a query for a status of the specific short code;

reporting the status of the specific short code to the second application provider; and periodically broadcasting to the first application provider and the second application provider information regarding (i) which short codes have recently been leased and (ii) which leases for short codes are soon to expire.

13. The method of claim 12, wherein the status is leased.

14. The method of claim 12, further comprising:

receiving from the second application provider a query for an identification of a lessee of the specific short code; and reporting an identification of the first application provider to the second application provider.

15. The method of claim 14, wherein the identification includes at least two of a name of the first application provider, a mailing address of the first application provider, a telephone number of the first application provider, an email address of the first application provider, a point of contact for the first application provider, a date on which the first application provider's lease ends, a login ID and password of the first application provider, and a Web site URL of the first application provider.

16. The method of claim 14, further comprising reporting a specified period of time during which the specified short code is assigned to the first application provider.

17. The method of claim 12, further comprising:

receiving from the second application provider a query for a lease price for the specific short code; and reporting the lease price to the second application provider.

18. The method of claim 17, wherein the lease price depends on at least one of when the specific short code is leased, how long the specific short code is leased, and how popular the specific short code is.

19. The method of claim 12, wherein verifying the availability of the specific short code further comprises contacting one of a network facilitator and a wireless carrier to determine if the specific short code is available.

20. The method of claim 12, wherein the query is received from an entity acting on behalf of the second application provider.

21. The method of claim 20, wherein the entity comprises one of a network facilitator and a wireless carrier.

22. The method of claim 12, further comprising rescinding a leased short code as a result of low usage.

23. A system for transmitting a message from a mobile subscriber to an application provider using a short code, the system comprising:

an administrator in communication with a database, wherein the database contains the short code and a status of the short code that indicates that the short code is leased;

a plurality of network facilitators selectably connectable to the administrator and logically operating as a singe network facilitator; and a plurality of wireless carriers, each being selectably connectable to and associated with at least one of the plurality of the network facilitators, wherein the mobile subscriber is associated with one of the plurality of wireless carriers wherein the one of the plurality of wireless carriers connects to the associated network facilitator when receiving the message from the mobile subscriber addressed to the short code, wherein the associated network facilitator communicates with the administrator to obtain routing information indicating to which one of a plurality of application providers the short code is assigned, and based on the information thereafter delivers the message to the application provider, wherein the administrator, in response to a request asking whether the short code is available, provides the status of the short code, and wherein the administrator periodically broadcasts to interested parties information regarding (i) which short codes have recently been leased and (ii) which leases for short codes are soon to expire.

24. The system of claim 23, wherein the status comprises an indication that the short code is leased and an identification of the application provider.

25. The system of claim 24, wherein the identification comprises at least two of a name of the application provider, a mailing address of the application provider, a telephone number of the application provider, an email address of the application provider, a point of contact for the application provider, a date on which the application provider's lease ends, a login ID and password of the application provider, and a Web site URL of the application provider.

26. The system of claim 23, wherein the database contains prices for leasing the short code, and wherein the administrator, in response to a request for the price for leasing the short code, provides the price for leasing the short code.

27. The system of claim 23, wherein the administrator is configured to rescind a leased short code as a result of low usage.

* * * * *

UNITED STATES PATENT AND TRADEMARK OFFICE
CERTIFICATE OF CORRECTION

PATENT NO. : 7,460,873 B2  Page 1 of 1
APPLICATION NO. : 10/889024
DATED : December 2, 2008
INVENTOR(S) : Robert C. Lovell, Jr. et al.

It is certified that error appears in the above-identified patent and that said Letters Patent is hereby corrected as shown below:

| | |
|---|---|
| Column 4, line 12, | delete "NF3," |
| Column 12, claim 15, line 15, | "first application provider. a telephone" should be --first application provider, a telephone-- |

Signed and Sealed this

Ninth Day of June, 2009

JOHN DOLL
*Acting Director of the United States Patent and Trademark Office*